United States Patent [19]

Smith et al.

[11] Patent Number: 4,613,168

[45] Date of Patent: Sep. 23, 1986

[54] METHOD OF MAKING BRANCHES IN HOSES

[75] Inventors: Ian P. Smith, Holt; David L. Prandle; Reginald C. Barker; Robert M. J. Litherland, all of Bradford-on-Avon, all of England

[73] Assignee: Avon Industrial Polymers Limited, Wiltshire, England

[21] Appl. No.: 470,707

[22] Filed: Feb. 28, 1983

[30] Foreign Application Priority Data

Mar. 4, 1982 [GB] United Kingdom ................. 8206443

[51] Int. Cl.⁴ ............................................. F16L 41/00
[52] U.S. Cl. .................................... 285/150; 285/156; 285/200; 285/423; 285/189; 285/158
[58] Field of Search ............... 285/158, 156, 189, 423, 285/DIG. 16, 260, 200, 150, 239, 240, 241, 222; 156/294, 280

[56] References Cited

U.S. PATENT DOCUMENTS

| 501,715 | 7/1893 | Hardwick | 285/238 |
| 2,935,341 | 5/1960 | Steinen | 285/238 |
| 4,036,514 | 7/1977 | Hannover | 285/423 |
| 4,214,781 | 7/1980 | Joseph | 285/222 |

FOREIGN PATENT DOCUMENTS

| 0164658 | 1/1954 | Australia | 285/423 |
| 2147675 | 3/1973 | Fed. Rep. of Germany | 285/200 |
| 2443824 | 2/1976 | Fed. Rep. of Germany | |
| 2551386 | 5/1977 | Fed. Rep. of Germany | |
| 2038437 | 7/1980 | United Kingdom | 285/423 |
| 2118264 | 10/1983 | United Kingdom | 285/150 |

Primary Examiner—Cornelius J. Husar
Assistant Examiner—Eric K. Nicholson
Attorney, Agent, or Firm—Omri M. Behr

[57] ABSTRACT

A strong joint for hoses for the cooling and crankcase ventilation systems of vehicles is made between a hose 1 and a branch by inserting the flared end 3 of a rigid cylindrical insert 4 into a hole 9 in the hose 1 to distort the margin around the hole. A second hose 6 is then positioned over the insert 4 so that its end abuts the margin of the hole and the joint is sealed and secured by an encapsulation which is vulcanized in situ.

A curable polymeric liner 5 may be sandwiched between the insert 4 and the spout 6 and also vulcanized to act as a bond.

The second hose may be omitted, leaving the insert as a projection to which a second hose may be fitted by other means.

16 Claims, 3 Drawing Figures

METHOD OF MAKING BRANCHES IN HOSES

FIELD OF THE INVENTION

This invention relates to methods of making branches in hoses. These are used in fluid distribution systems and particularly important applications are in the cooling and crankcase ventilation systems of vehicles. There is no problem in the making of a direct flexible conduit which is to conduct material from point A to point B, but sometimes it is desired to take off or bring part of that fluid flow to or from a further point and the reliable formation of the necessary branch in the hose in the past caused considerable difficulty.

BACKGROUND OF THE INVENTION

One method, of course, is to cut the main hose, also known as the barrel, insert a metal T-piece and secure the branch, known as the spout, to the metal T-piece. This on-site assembly is clearly uneconomic in terms of the number of parts used and the degree of fabrication involved, and is more prone to failure by leakage.

One of the current processes for fabricating spouted hoses involves the insertion of the end of the spout (which may be grooved) into a tightly fitting hole in the barrel and the in situ moulding around the junction of an encapsulating boss of polymer. Such joints are however prone to mechanical failure and are always the weakest point in the hose part of the pressure system. More recently and in an attempt to meet that problem there has been developed (DE-B-2443824 and DE-A-2551386) a method whereby the complete entity namely the barrel and the spout are preformed in unvulcanised material and are vulcanised as a single entity. There are difficulties of quality control in such a process, at least as soon as the sizes of the assemblies become at all large and the shapes of the assemblies at all complex.

SUMMARY OF THE INVENTION

Our method aims to produce a branch in a hose wherein the junction of the spout and the barrel is at least as strong as any other part of the assembly so that as a result any reasonable technical specification can be met. This offers the user an enchanced range of application.

In this method we form the spout around a rigid insert into a preformed hole in the barrel. The end of the insert which projects into the barrel is outwardly flared. The insert is oversized for the hole and thereby distorts the margins of the hole. The degree of oversize of the flared end is such however that it may be inserted through the hole by distorting the hole. To lock the material of the barrel around the flared end of the insert so that it can no longer escape, an encapsulating boss of polymeric materials is vulcanised in situ whereby to bond and seal the margin of the hole in the barrel in place against the rigid insert. The encapsulation thus formed may seal in the insert only, or may bond and seal in also a second hose forced over the rigid insert. It is a desirable feature of the design that the periphery of the hole and the end of the second hose physically abut.

The retention of the spout formed by the second hose on the insert may be assisted not only by the formation of the encapsulating boss but also by bonding of the inner surface of the spout to the outersurface of the insert, which may be done indirectly through a curable polymeric liner.

It is preferred to pre-taper the outer surface of the second hose before it is fitted over the insert so that the extreme end of the second hose is radially thinner than other parts of it. This assists a snug abutting action against the margin of the hole in the barrel and, at least if the encapsulating boss is of a generally conical formation tapering outwardly away from the barrel, gives a maximum rubber thickness at the region of the abutment between the second hose and the margin around the hole in the barrel, thereby providing maximum strength at this position.

It is preferred also to increase the adhesion between the flared part of the insert and the inner surface of the barrel by bonding which, as in the case of the bonding of the insert to the second hose may be direct or be indirect through the or another curable polymeric liner. The bonding between the various surfaces of the assembly and also lubrication during the physical assembly steps can be assisted by coating the relevant surfaces with a curable liquid bonding agent.

It can be seen therefore that the assembly (or part assembly) is formed from pre-vulcanised and finished hose, and a rigid insert both of which are readily handleable and of ascertained quality and reliability.

DESCRIPTION OF THE DRAWINGS AND OF A PREFERRED EMBODIMENT

Particular embodiments of the present invention will now be described with reference to the accompanying drawings wherein.

Figure 1:
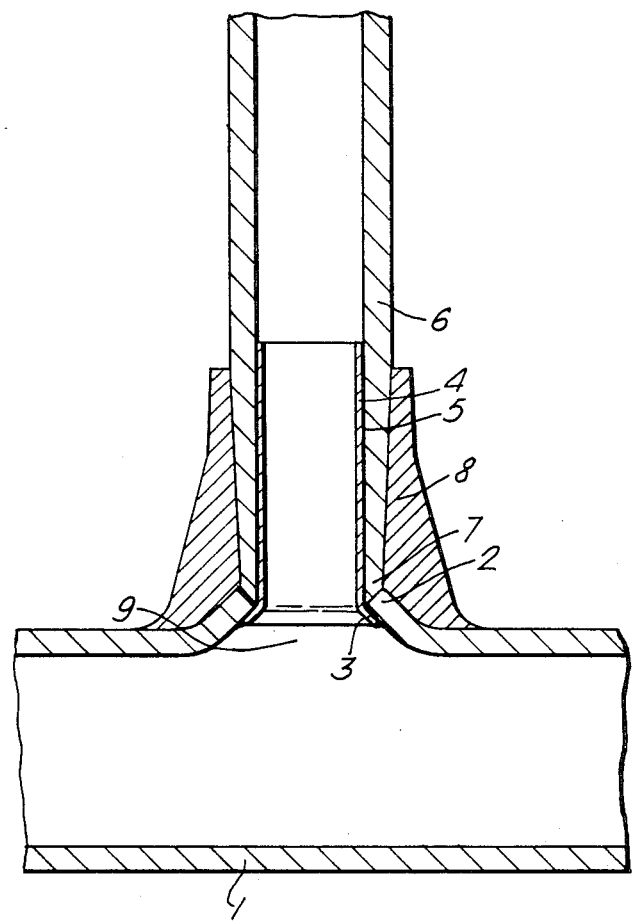
FIG. 1 is a diagrammatical section through a finished joint.

As seen in FIG. 1, a main hose or barrel 1 is made of polymeric material which may be reinforced, by for example, knitted material. A desired length of the completely prepared hose is taken and a hole 9 is punched into it. Into this hole, the marginal portion of which is indicated at 2, is inserted the flared end portion 3 of a rigid insert 4 which is a cylindrical sleeve with the flared end extending at an angle suitable for the application, with a radius at the transition. It may be of any suitable material and in particular may be brass. The diameter of the cylindrical part of the insert is greater than the diameter of the hole punched in the barrel so that a portion 2 is deformed into the conically outwardly projecting shape when the insert is in position, as can be clearly seen from FIG. 1.

Before insertion both the inner and the outer surface of the barrel in the region around the hole 9 are preferably coated with a curable liquid bonding agent, and a curable polymeric liner 5 may be positioned to lie between the flared portion 3 and the wall portion 2. In the drawing this is shown extending the whole length of the sleeve but two separate liners might be used one over the flare and one on the cylindrical portion.

The next stage is to slide over the polymeric liner 5 the end of a second hose 6 which is the spout of the spouted joint and which like barrel 1 is formed of suitable polymeric material such as a knitted hose. This forcing over of the hose may be assisted by the presence of the polymeric liner 5 and on the inner surface of the leading end 7 of the hose 6 of a liquid curable bonding agent.

Before the positioning of the second hose 6 its leading end 7 may be tapered for example by buffing or grinding so that, at its extremity, the leading end 7 is, say, about half of its original thickness. This provides three effects. Firstly, the outer surface of the second hose 6 is thereby somewhat roughened to provide a mechanical key for the encapsulation which is to follow. Secondly, the narrowing of the leading edge causes an improved contact and wedging action when it abuts against the cut surface of the wall portion 2 of the barrel, as forced upwardly and outwardly around the flared end 3 of the insert, and thirdly, it maximises the polymeric width of the encapsulation outside it which is effective in resisting internal pressure.

A ring of unvulcanised polymeric material is placed around the end portion of the spout and is moulded to form an encapsulation 8 conical in shape which reinforces and overlies both the wall part 2 and the spout 6 where it is over the insert 4. The outer surface of the wall part 2 may have been treated by buffing and/or the application of a liquid curable bonding agent so as to assist this adhesion.

Figure 2:
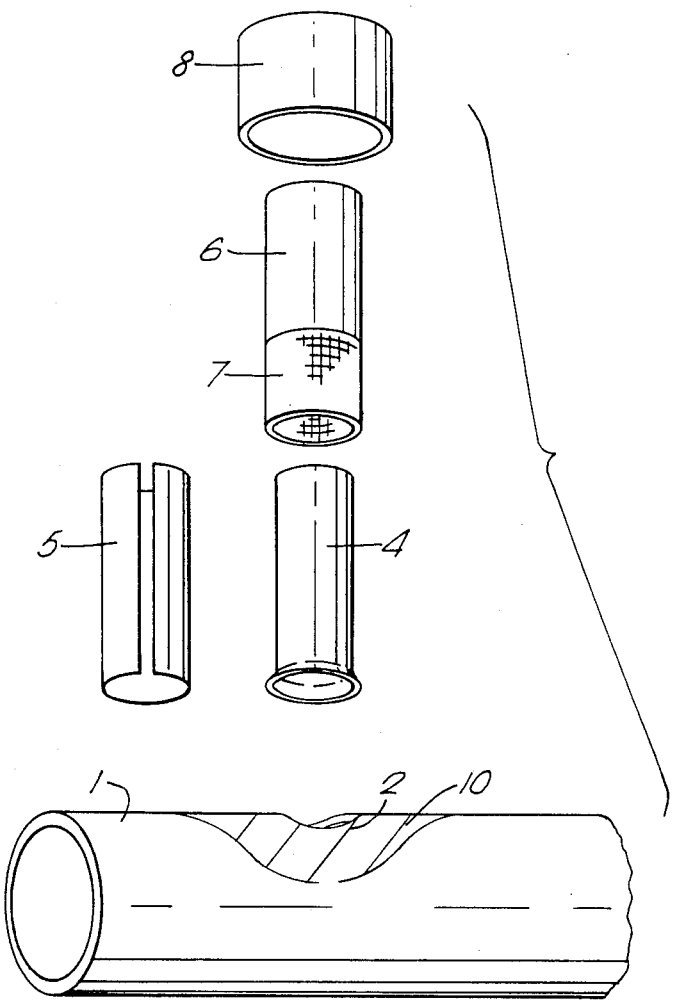
FIG. 2 is an exploded perspective view of the components of the joint.
Figure 3A:
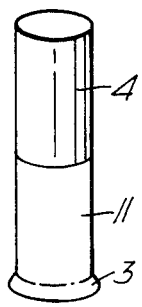
FIG. 3 show seven stages during two alternative formation methods.
Figure 3B:
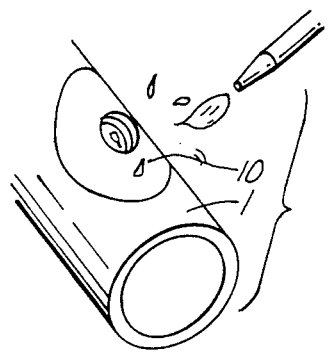
Figure 3C:
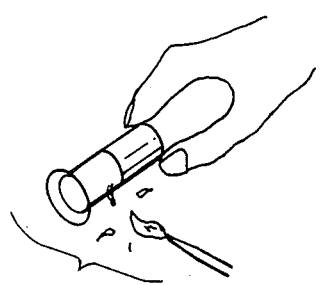
Figure 3D:
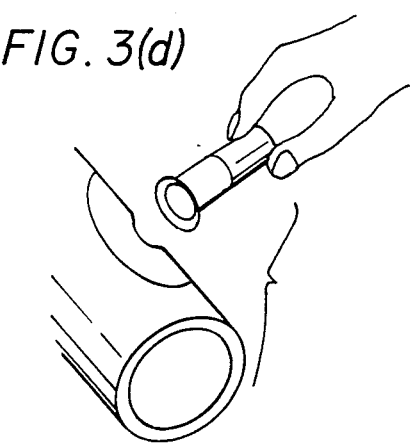
Figure 3E:
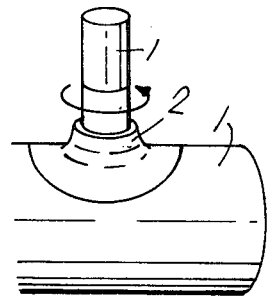
Figure 3F:
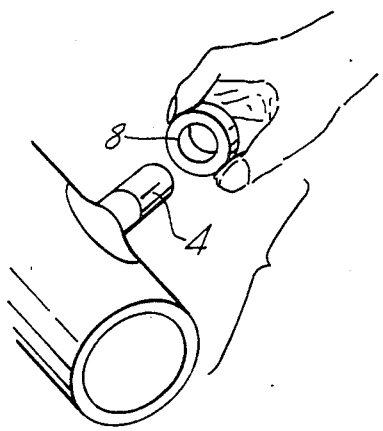
Figure 3G:
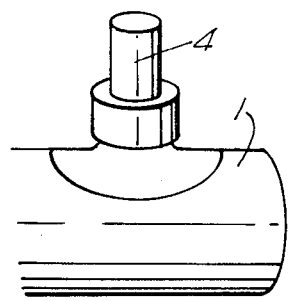
Figure 3H:
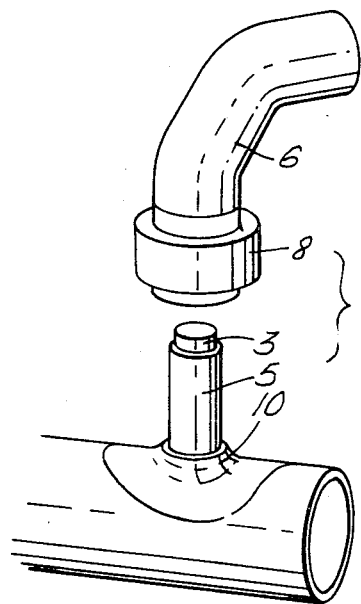
Figure 3I:
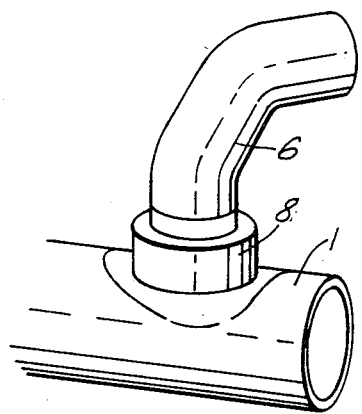

The parts are seen in exploded view in FIG. 2 with a barrel 1, its cut or punched hole surrounded by part 2 (with an area treated by bonding agent indicated by hatchings (10), the rigid insert 4 which may be a brass part and the liner 5 which is a split sleeve. The taper at the leading end portion 7 of the second hose 6 which is a knitted spout can be seen as can the raw ring form of the encapsulating boss 8.

The sequence of assembly is seen in FIG. 3.

In stage A of FIG. 3 is shown the flared insert 4 showing also how part of it, 11 is treated with a liquid curable polymeric material.

Meanwhile in stage B the curable bonding agent is being applied to the area 10 of the barrel 1 surrounding the hole 9 which is punched in it and further solution is than applied to the area 11 of the insert. It is forced into the barrel than pulled outwardly to cause the outward distortion of the portion 2 and provide an outward bias of the inner circumferential surface of the opening.

A preliminary bond has been formed through the curable liquid between the flared end 3 and the inner wall of that barrel 1. In one alternative the raw material of the encapsulating boss 8 is now placed over the insert and the assembly ready for curing is seen in stage G of FIG. 3. This will yield an assembly in which after moulding the encapsulating boss 8, the rigid insert 4 will be left projecting from a vulcanised boss on the surface of the barrel.

In an alternative to stage F and G of FIG. 3, shown in stages H and I, a second hose 6 is brought down over the insert 4, to which a curable polymeric liner 5 has been applied, is forced down and the boss 8 pushed down towards the barrel to give the condition seen in stage I. Then, the ring is moulded to shape, in the process vulcanising also the polymeric liner 5 and the curable bonding liquid.

What I claim is:

1. A branched hose comprising:
   a main hose portion of distortable material, a segment of said main hose defining a marginal portion around an opening in said hose, said opening having an inner circumferential surface,
   a rigid insert comprising a tubular stem having two ends, one of said ends being outwardly flared, the diameter of said tubular stem distal from said flared end being greater than the undistorted diameter of said opening, the said insert being located in said opening with its flared end inwardly of the outer surface of said marginal portion and its stem projecting outwardly of said main hose whereby the inner circumferential surface of the opening in said marginal portion is outwardly biased in an outwardly distorted condition and
   an encapsulation overlying said marginal portion and bonding at least said marginal portion of said main hose and said stem of said insert whereby to retain the insert in the main hose by holding and reinforcing said marginal portion in its said distorted condition.

2. A hose in accordance with claim 1 wherein the encapsulation directly contacts the said stem.

3. A hose in accordance to claim 1 further including a second hose having a first proximal end portion, said first proximal said portion of said second hose surrounding the projecting portion of said stem and being coaxial therewith, the encapsulation contacting directly at least the first said proximal end portion of said second hose and thereby indirectly encapsulating said stem.

4. A branched hose according to claim 3 wherein a leading end of the said proximal end portion of the second hose is in abutting relationship with said marginal portion.

5. A branched hose according to claim 3 having a taper on the outer surface of the said proximal end portion of said second hose, whereby said second hose is thinnest at said leading end.

6. A branched hose according to claim 5 wherein at least one of said main and said second hose has a cured polymeric lined sandwich between said insert and said hoses.

7. A method of making a branched hose having a rigid insert comprising a tubular stem having two ends, one of said ends being outwardly flared, a main hose of distortable material and marginal portion of said main hose defining the margins of an opening having an inner circumferential surface having a diameter when undistorted, less than that of the portion of said tubular stem distal from said flared end, comprising:
   a. inserting said outwardly flared end of said rigid insert inwardly of the outer surface of said marginal portion and thus distorting said marginal portion and outwardly biasing said inner circumferential surface;
   b. encapsulating and bonding at least said marginal portion to retain said insert in the assembly of said branched hose by reinforcing and overlying said marginal portion.

8. A method of making a branched hose according to claim 7 including the additional steps of:
   c. fitting a curable polymeric liner over said insert; and
   d. fitting an end portion of a second hose over said liner to abut said marginal portion, whereby said encapsulation step includes encapsulating also at least part of said end portion of said second hose.

9. A method of making a branched hose according to claim 8 including the additional steps of:
   e. fitting a curable polymeric liner between said rigid insert and said second hose; and
   f. vulcanising said encapsulation in situ whereby also to cure the said liner.

10. A method of making a branched hose as claimed in claim 7 including the additional steps of, while maintaining the rigid insert in said inserted position, passing a proximal end of a second hose over the said stem of the insert until the said end of the second hose abuts the said marginal portion, and carrying out said encapsulating step to encapsulate also the end of the second hose.

11. A method of making a branched hose as claimed in claim 10 including tapering the thickness of the said end portion of the second hose comprising its said end so that the said end portion is thinnest at the said end.

12. A method of making a branched hose as claimed in claim 11 wherein the end of the second hose and the face of the distorted marginal portion are in face-to-face abutment.

13. A method of making a branched hose assembly comprising the steps of:

insertng the flared end of a rigid insert having a tubular stem with two ends, one of said ends being outwardly flared, into an opening having an inner circumferential surface, in a main hose of distortable material to distort the segment of the main hose marginal to said opening to bias said inner circumferential surface outwardly and to a shape corresponding generally to that of the flare and forming an encapsulating mass of polymeric material overlying the exterior of at least the marginal portion of said main hose to bond to and reinforce that portion and to a segment of the insert projecting from said main hose whereby to hold said marginal segment between the flared portion of the insert and the said mass and thereby to retain the insert in the assembly.

14. A method according to claim 13 wherein said polymeric material is bonded directly to said insert.

15. A method according to claim 14 including additionally:

fitting a proximal end portion of a second hose over a projecting end portion of the insert, the encapsulation step including encapsulating also the said end portion of the second hose to bond indirectly to the insert.

16. A method according to claim 15 further including the step of sandwiching at least one curable polymeric liner between at least one of said main and said second hoses once said insert, said liner being cured during the formation of the encapsulation.

* * * * *